United States Patent
Spangler et al.

(10) Patent No.: US 6,547,493 B2
(45) Date of Patent: Apr. 15, 2003

(54) MODULAR FIBER LOG EROSION AND SEDIMENT CONTROL BARRIER

(75) Inventors: J. Eric Spangler, Indianapolis, IN (US); Kumar Gopalan Jayanath, Sterling, MA (US); Bob Abbott, Indianapolis, IN (US); James A. Blazek, Indianapolis, IN (US)

(73) Assignee: Fiber King, LLP, Indianapolis, IN (US)

( * ) Notice: Subject to any disclaimer, the term of this patent is extended or adjusted under 35 U.S.C. 154(b) by 0 days.

(21) Appl. No.: 09/805,394

(22) Filed: Mar. 13, 2001

(65) Prior Publication Data

US 2002/0131826 A1 Sep. 19, 2002

(51) Int. Cl.$^7$ .................. E02B 3/04; E02D 17/20
(52) U.S. Cl. .................. 405/302.6; 405/15; 405/21; 405/32; 405/258.1; 405/302.7
(58) Field of Search ............... 405/15–17, 19, 405/21, 22, 23, 26, 28, 32–34, 258.1; 47/65.5, 66.1, 66.3, 66.5–7, 59 R

(56) References Cited

U.S. PATENT DOCUMENTS

| | | | | |
|---|---|---|---|---|
| 486,887 A | * | 11/1892 | Neale | 405/16 |
| 2,135,337 A | * | 11/1938 | Herbest, Jr. | 405/32 |
| 4,420,275 A | * | 12/1983 | Russer | 405/18 X |
| 4,784,520 A | | 11/1988 | Stevens | 405/21 |
| 5,015,123 A | * | 5/1991 | Houck et al. | 405/45 |
| 5,059,065 A | * | 10/1991 | Doolaege | 405/115 |
| 5,158,395 A | * | 10/1992 | Holmberg | 405/21 |
| 5,338,131 A | | 8/1994 | Bestmann | 405/24 |
| 5,425,597 A | | 6/1995 | Bestmann | 405/24 |
| 5,429,450 A | | 7/1995 | Meidinger | 405/15 |
| 5,505,557 A | * | 4/1996 | Bradley | 405/15 |
| 5,536,111 A | | 7/1996 | Doernemann | 405/16 |
| 5,584,599 A | | 12/1996 | Knittel | 405/15 |
| 5,641,244 A | | 6/1997 | Bestmann | 405/16 |
| 5,669,732 A | | 9/1997 | Truitt | 405/20 |
| 5,678,954 A | | 10/1997 | Bestmann | 405/24 |
| 5,778,622 A | | 7/1998 | Baker | 52/405.3 |
| 5,913,790 A | | 6/1999 | Dawson | 52/609 |
| 5,951,202 A | | 9/1999 | Brown | 405/19 |
| 6,109,835 A | * | 8/2000 | Grabhorn | 405/21 X |
| 6,199,591 B1 | * | 3/2001 | Kiest, Jr. et al. | 405/150.1 X |

FOREIGN PATENT DOCUMENTS

EP 562135 * 9/1993 ............ 405/15

* cited by examiner

Primary Examiner—Jong-Suk Lee
(74) Attorney, Agent, or Firm—Woodard, Emhardt, Naughton Moriarity & McNett

(57) ABSTRACT

A modular erosion and sediment control barrier. The linear modular erosion and sediment control barrier is constructed of fiber logs joined end-to-end. Each fiber log is made of a quantity of loose fibers retained in a tubular casing by a plug. The tubular casing includes an extended section which is peeled back and folds over the end of the coupler fiber log during storage and transportation. When deployed, the extended section is unfolded to receive the end of an adjacent fiber log. The two fiber logs are secured together by a cord and hooks.

24 Claims, 10 Drawing Sheets

MODULAR FIBER LOG EROSION AND SEDIMENT CONTROL BARRIER

The present invention generally relates to an erosion and sediment control barrier, and more specifically relates to a modular erosion and sediment control barrier composed of coupler fiber logs.

DESCRIPTION OF A PREFERRED EMBODIMENT

Figure 1:
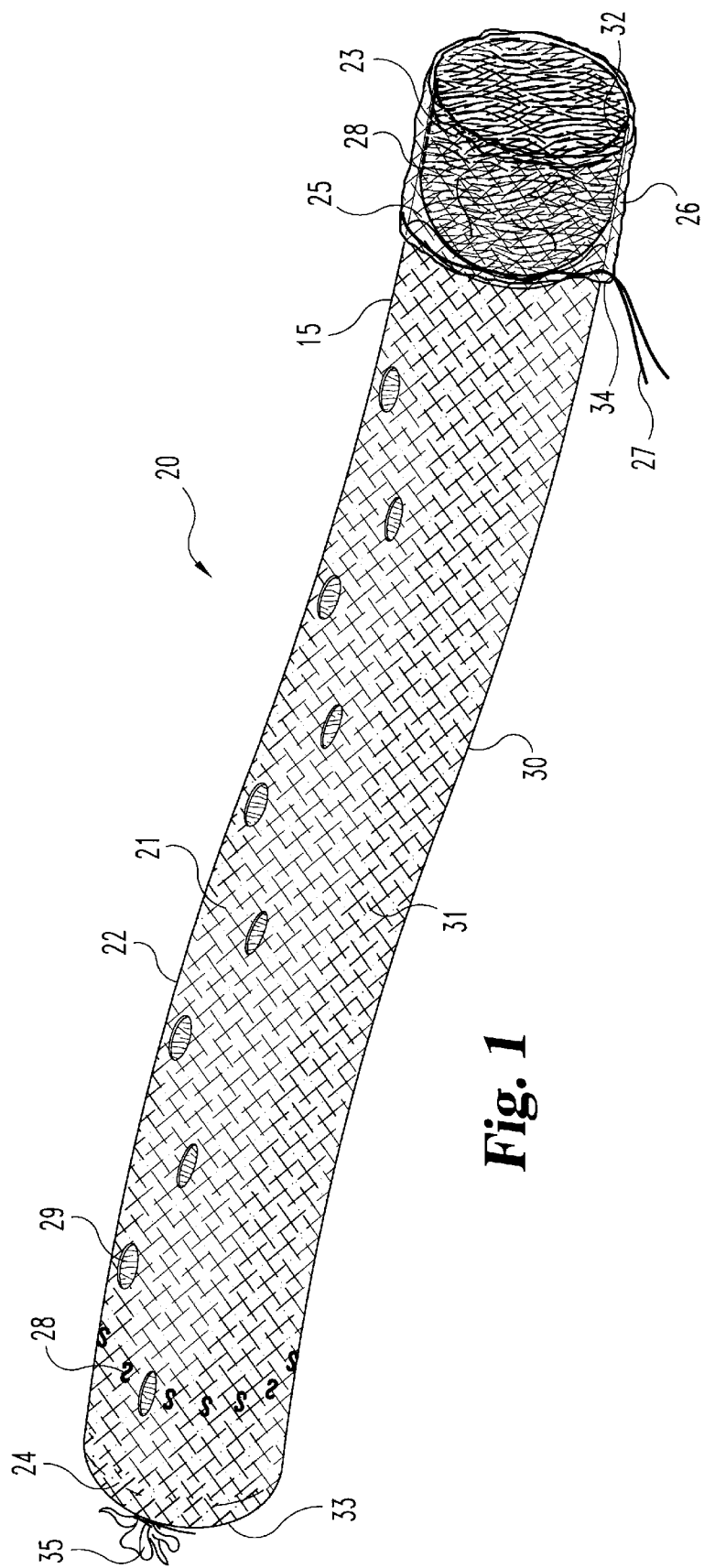
FIG. 1 is a perspective view of a circular coupler, a first embodiment of the coupler fiber logs of the present invention.

For the purpose of promoting an understanding of the principles of the present invention, reference will now be made to the embodiments illustrated in the drawings and specific language will be used to describe the same. It will nevertheless be understood that no limitation of the scope of the invention is thereby intended. Any alterations and further modifications in the illustrated device, and any further applications of the principles of the invention as illustrated therein being contemplated as would normally occur to one skilled in the art to which the invention relates are also included.

An aspect of the present invention is a coupler fiber log which can be used singly or in combination as an erosion and/or sediment barrier. The term "log", hereinafter, describes an elongated object having greater lengths than cross-sectional widths. The coupler fiber log includes a quantity of fibrous filler held inside a casing, and further includes means to join an adjacent coupler fiber log in an end-to-end orientation. The coupler fiber logs can be formed to any shape and size to accommodate the needs of an application. Commonly, the coupler fiber logs have circular, rectangular or triangular cross sections. However, it is contemplated that the coupler fiber logs may be formed into any shape. In selected embodiments, plant wells or other means are provided to promote plant growth within the coupler fiber logs.

Referring now to the drawings wherein like reference numerals designate corresponding components throughout the several views. FIG. 1 shows a circular coupler fiber log or circular coupler 20, a first embodiment of the coupler fiber log of the present invention. The term "circular", hereinafter, describes all planar shapes that are approximately round or partially round. Circular coupler 20 has a circular cross section and a length extends therefrom. Circular coupler fiber log 20 includes a pack of fibrous filler 21 held inside a casing 22 by a plug 23. The pack of fibrous filler or filler pack 21 includes a first end 24 and a second end 25. Casing 22 includes an extended section or net extension 26 which extends beyond plug 23 and has a cinch cord 27 weaving around its end. When circular coupler 20 is being stored or transported, net extension 26 peels over and folds around, the exterior of circular coupler 20, proximal to second end 25. On the exterior of circular coupler 20, proximal to first end 24, a plurality of S-hooks 28 are provided. Also on the exterior of circular coupler 20, a series of plant wells 29 are provided.

Casing 22 holds the quantity of loose fiber forming the pack of fibrous filler or filler pack 21. Preferably, casing 22 allows fluid communication between filler pack 21 and the outside environment. It is contemplated that casing 22 is constructed of a porous or perforated material, or is formed with an open weave. In this illustrated embodiment, casing 22 is formed as a tubular mesh netting 30. Tubular mesh netting or net 30 has a length, grid-like openings 31 along its length, an interior chamber 32, a closed end 33, and an opened end 34. The total length of net 30 is defined by the combined lengths of filler pack 21, plug 23 and net extension 26. Preferably, net extension 26 is approximately three quarter to one time (¾ to 1) the prescribed diameter of circular coupler fiber log 20.

Grid-like openings 31 of net 30 provide the path for fluid communication between filler pack 21 retained inside casing 22 with the outside environment. Grid-like openings 31 vary in size and shape, but are generally rectangular and sufficiently small enabling the retention of the loose fibers of filler pack 21. In one embodiment, one side of grid-like opening 31 measures less than about two and a half (2½) inches. In another embodiment, one side of grid-like opening 31 measures about one and a half (1½) inches.

Net 30 is constructed from a tubular netting material. Such tubular netting materials are commercially available in roll form. A predetermined length is cut from such a roll and tied at one end with a cord 35 forming net 30 with a length, an interior chamber 32, a closed end 33 and an open end 34. However, it is contemplated that net 30 may be constructed individually and has an integrally formed closed end 33. The methods of constructing a tubular netting material are well known in the art. The tubular netting material may be formed by knotting at grid intersections to define the grid openings or formed by inter-braiding together strands of ropes or twines at the intersection of the openings, so that the openings are formed free of knots. It is understood that other methods of forming an open weave net may be used.

It is preferred that net 30 is constructed of a durable material, either natural or synthetic fibers, which can withstand the abrasive forces of the application site environments. In the illustrated embodiment, net 30 is constructed of extruded strands of polypropylene fibers. However, other synthetic materials, e.g., polypropylene and nylon, having adequate strength and durability may also be used. Cord 35, used for tying close net 30, may be made of any material, but are generally made of synthetic polymers like nylon and polypropylene. In applications where natural fibers are preferred, net 30 may be constructed from ropes or twine made of natural fibers such as jute, hemp, sisal, or coir. For such a natural application, cord 35 would made of a natural fiber, e.g., jute, sisal, hemp and coir.

The loose fibers used to pack circular coupler 20 are generally slow decaying natural fibers. Coir fiber being one of the slowest decaying natural fibers is a preferred choice of filler material. Coir fibers are graded by the length of the fibers, and are commercially available in bristle (long), mattress (medium) and omat (short) grades. Mattress grade coir fibers are preferably used. It is understood, however, that the other grades of coir fibers may also be used. It is further understood that other slow decaying natural or synthetic fibers may also be used without deviating from the scope and spirit of the present invention.

Figure 2:
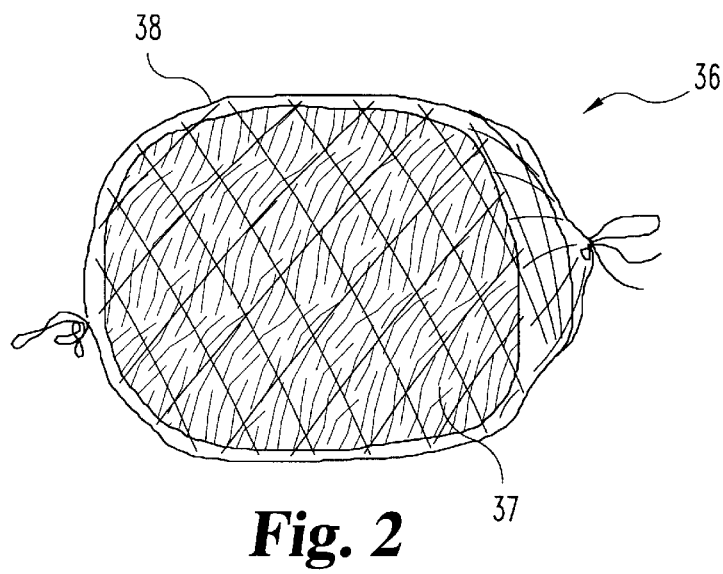
FIG. 2 is a perspective view of a fiber-ball plug, a first embodiment of the plugs of the present invention.

Plug 23 is provided for blocking open end 34 of casing 22 and for bridging the gap between the ends of two joined coupler fiber logs. FIG. 2 shows a first embodiment of plug 23, namely, a fiber-ball plug 36. Fiber-ball plug 36 is a ball of fibrous filler 37 held inside a net 38. Preferably, the same fibrous filler and casing material used to form circular coupler 20 are used to construct fiber ball plug 36. Fiber-ball plug 36 is packed to a sufficient stiffness adequate to prevent the loose fibers of filler pack 21 from escaping out of open end 34.

Figure 3:
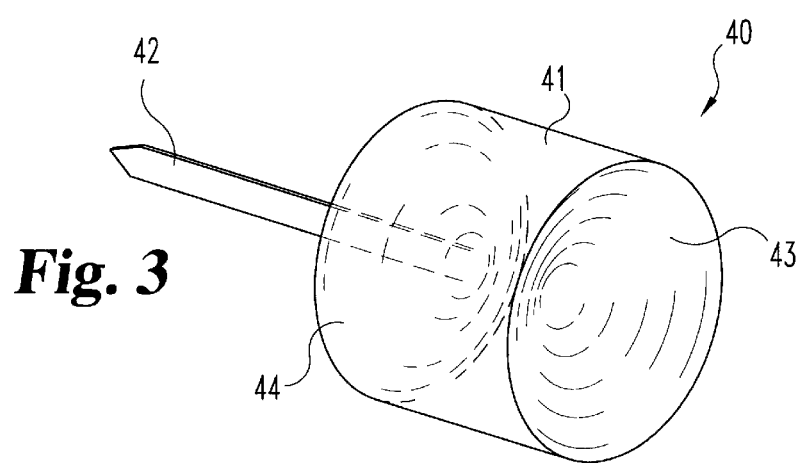
FIG. 3 is a perspective view of a pin plug, a second embodiment of the plugs of the present invention.

FIG. 3 shows a second embodiment of plug 23, namely a pin plug 40. Pin plug 40 includes a disk portion 41 and a stem portion 42. Disk portion 41 adapts to prevent passage block of the filler pack 21, and includes a diameter similar to that of circular coupler 20 for which pin plug 40 is intended to be placed, and a thickness between approximately 3 to 5 inches. Disk portion 41 further includes outside surface 43 and inside surface 44. Both surfaces 43 and 44 are preferably concave. When installed, outside surface 43 orients towards open end 34 of casing 22 while inside surface 44 faces filler pack 21. Stem portion 42 extends from second surface 44 of disk portion 41. Stem portion 42 adapted to anchor into fibrous filler pack 21 is cylindrical. Preferably, pin plug 40 is made of a material which has similar aging characteristics as filler pack 21. In one embodiment, pin plug 40 is made from a slow decaying wood. In another embodiment, pin plug 40 is made of fibers which are bonded together with latex.

Figure 4:
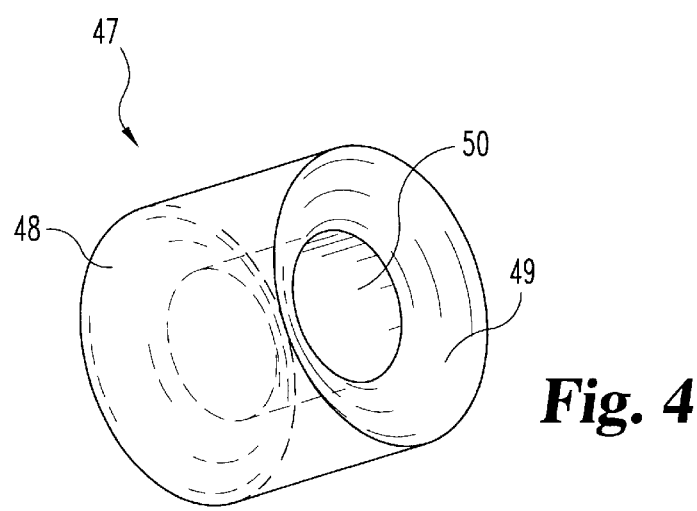
FIG. 4 is a perspective view of a disc plug, a third embodiment of the plugs of the present invention.

FIG. 4 depicts a third embodiment of plug 23, particularly identified as disc plug 47. Disc plug 47 is shaped like a donut and having a diameter, a thickness, an inside face 48 and an outside face 49 and a hole 50, extending between faces 48 and 49. The diameter of disc plug 47 is approximately the same as that of circular coupler 20 in which disc plug 47 is intended to be placed and the thickness is approximately 3 to 5 inches. Both faces 48 and 49 of disc plug 47 are preferably concave adapted to complement the shape of the ends of circular couple fiber logs 20. When installed, inside face 48 orients toward filler pack 21, while outside face 49 orients towards open end 34 of casing 22. Hole 50 is provided to enhance fluid communication and extends between inside face 48 and outside face 49. While a single hole is included in the illustrated embodiment, other configurations of perforations may be included instead. Preferably, disc plug 47 is made of a material that is flexible and compressible. In one embodiment, disc plug 47 is formed of latex. In the illustrated embodiment, disc plug 47 is made of latex bonded fibers. The adequate amount of fiber included is adequate to increase the stiffness of disc plug 47, but not to compromise its compressibility and flexibility. Preferably, the fiber dispersed in the latex is the same fiber used to pack circular coupler fiber logs 20. However, any non-reacting fibers may be used.

S-hooks 28 are provided to couple two adjacent circular couplers 20 together, and are attached to the exterior of net 30 proximal to first end 24 of circular coupler 20. S-hooks 28 may be of any dimension which are capable of joining the cinch cord 27 of a first circular coupler 20 to net 30 of an adjacent circular coupler 20. In the illustrated embodiment, S-hooks 28 are approximately one inch in length. In addition, S-hooks 28 are preferably made of stainless steel. However, materials which have the requisite strength and resistance to the environmental agents may also be used.

Cinch cord 27 weaves around open end 34 of casing 22 and is for joining two adjacent circular couplers 20. Cinch cord 27 is formed of a durable material, for example, nylon or polypropylene. In the illustrated example, the cinch cord 27 is formed of nylon. In addition, cinch cord 27 may be of any diameter having the strength of holding two circular couplers 20 together. In one embodiment, for coupling two 16-inch diameter circular couplers 20, cinch cord 27 is 0.125 inch in diameter.

Plant wells 29 are cavities formed into the sides of circular coupler fiber logs 20 and are cut adequately deep for the placement of seeds or seedlings and plant growth medium. In the illustrated embodiment, plant wells 29 are approximately 2 inches in diameter and 4 inches deep. Plant wells 29 are placed in two rows at the top surface along the length of circular coupler 20. The two rows are placed, when viewing from a cross section of circular coupler 20, at approximately the 2 o'clock and 10 o'clock positions. In addition, consecutive plant wells 29, measuring along the length of circular coupler 20, are about six inches apart.

In general, plant wells are provided in coupler fiber logs which are intended for permanent placement and at site where water is available. It is contemplated that, with the right encouragement, vegetation/plants grow through the coupler fiber logs and their roots anchor into the underlying sediment/soil. It is further contemplated that the anchoring plant roots hold the underlying soil in place, thus, providing added stabilization against further erosion. While plant wells 29 are contemplated as a means to promote plant growth, other plant growth promoting methods are also contemplated. In one embodiment of the present invention, the coupler fiber logs are incorporated with plant seeds and a quantity of plant growth promoting medium (plant food or fertilizer). It is contemplated that under favorable conditions, the incorporated seeds germinate and the plant growth promoting medium provide the necessary nutrient for the roots of the newly germinated plants to grow through the coupler fiber logs and anchor into the underlying sediment/soil. It is further contemplated to start germination of the incorporated seeds prior to delivery of coupler fiber logs to the final installation site, thusly shortening the time required for plants to take root in the underlying sediment/soil.

Circular couplers 20 can be packed to any length prescribed by an application. For weight and maneuverability considerations, circular couplers 20 are generally packed to less than 20 feet in length. In one embodiment, circular couplers 20 are packed to approximately 7-½ feet long. This length allows circular couplers 20 to fit on a conventional pallet for transporting on a conventional semi-trailer. Similarly, circular couplers 20 can be packed to any diameter suitable for specific applications. In the various embodiments of the present invention, circular couplers 20 are packed to approximately 6, 8, 12, 16, and 20 inches in diameter.

Circular couplers 20 can be packed to a range of fiber densities to suit the demand of the application sites. Generally, a denser coupler fiber log is desirable at locations where the area soils are subjected to greater erosive forces, and at locations where greater longevity and durability are required. A lighter coupler fiber log is adequate for areas where the soils are subjected to lesser erosion forces, and at locations where longevity and durability are a lesser issue. In one embodiment, for use as an erosion and sediment control barrier along the bank of a swift river, circular coupler fiber logs 20 are packed to a packing density of nine (9) pounds per cubic foot. In another embodiment, for use in the wetlands of a quiet river channel, circular coupler fiber logs 20 are packed to a packing density of five (5) pounds per cubic foot.

Figure 5:
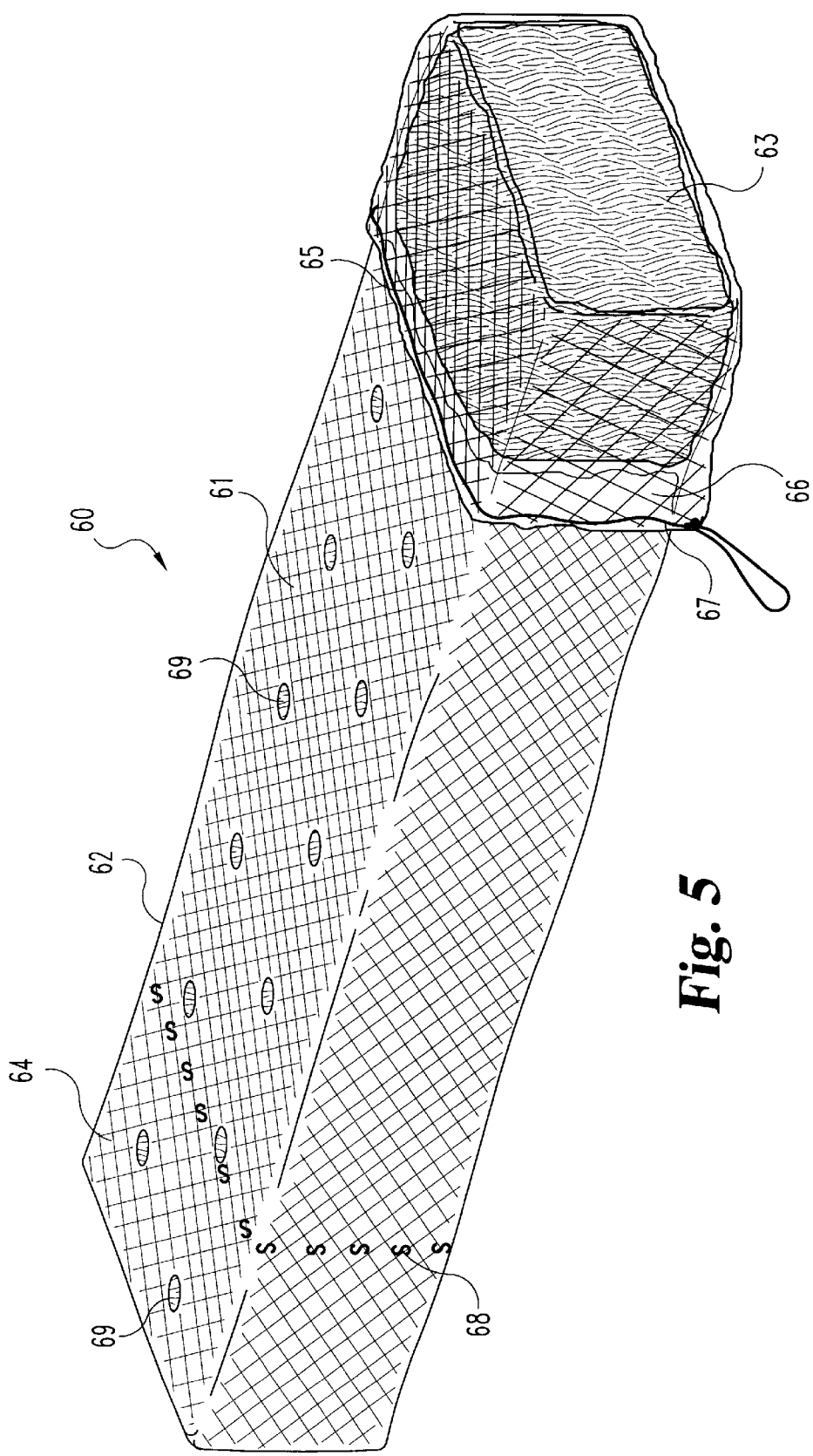
FIG. 5 is a perspective view of a rectangular coupler, a second embodiment of the coupler fiber logs of the present invention.

FIG. 5 shows a rectangular coupler fiber log or rectangular coupler 60, a second embodiment of the coupler fiber log of the present invention. The term "rectangular", hereinafter, describes all four-sided polygonal shapes. These shapes range from a true square to a quadrilateral having four unequal sides and four unequal angles. Rectangular couplers 60 have the added advantage that they are easily stacked to form a terrace or a retaining wall.

Rectangular coupler fiber log 60 shares many features of circular coupler 20 which have been described previously. Rectangular coupler 60 has a rectangular cross section and a length extends therefrom. While a cross sectional shape close to a true rectangle is preferred, any four-sided polygonal shapes are within the scope of the present invention. Rectangular coupler fiber log 60 includes a pack of fibrous filler 61 held inside a casing 62 by a plug 63. Rectangular coupler fiber log 60 further includes a first end 64 and a second end 65. Casing 62 is similarly constructed as casing 22 of circular coupler 20. Casting 62 also includes an extended section or net extension 66 which extends beyond plug 63, and having a cinch cord 67 weaves around its end. During storage and transportation, net extension 66 peels over and folds around second end 65. Plug 63 is shaped to compliment the cross section of rectangular coupler 60, but is otherwise constructed similar to plug 23 of circular coupler fiber log 20. On the exterior of rectangular coupler 60, proximal to first end 64, a plurality of S-hooks 68 are provided. Also on the exterior of circular coupler 60, series of plant wells 69 are provided. Plant wells 69 are also similarly form as plant wells 29 of circular coupler 20.

Figure 6:
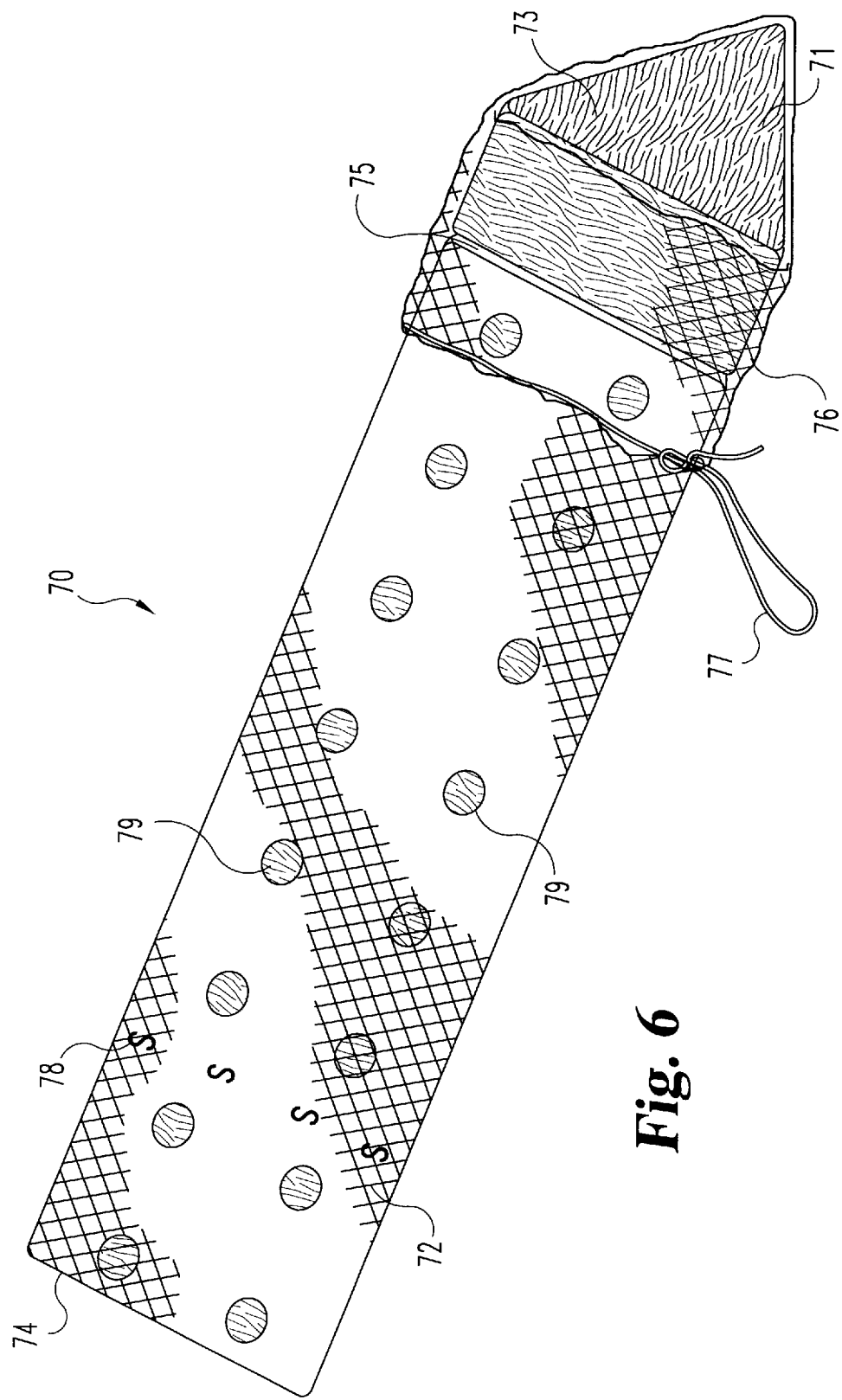
FIG. 6 is a perspective view of a triangular coupler, a third embodiment of the coupler fiber logs of the present invention.

FIG. 6 shows a triangular coupler fiber log or triangular coupler 70, a third embodiment of the coupler fiber log of the present invention. The term "triangular", hereinafter, describes all the shapes of a three-sided polygon. Generally, triangular coupler 70 is more stable against movement because of its wider base relative to its mass. It is contemplated that triangular coupler 70 has applications as erosion and sediment barrier on steep slopes.

Triangular coupler 70 shares many of the features of circular coupler 20 which have been described previously. Triangular coupler 70 has a triangular cross section and a length extends therefrom and includes a pack of fibrous filler 71 held inside a casing 72 by a plug 73. The pack of fibrous filler or filler pack 71 includes a first end 74 and a second end 75. Casing 72 is similarly constructed as casing 22 of circular coupler 20. Casing 72 includes an extended section or net extension 76 which extends beyond plug 73 and having a cinch cord 77 weaves around its end. During storage and transportation, net extension 76 peels over and folds around second end 75. Plug 73 is shaped to compliment the cross section of triangular coupler fiber log 70, and otherwise is constructed similar to plug 23 of circular coupler fiber log 20. On the exterior of triangular coupler 70, proximal to first end 74, a plurality of S-hooks 78 are provided. Also on the exterior of triangular coupler 70, series of plant wells 79 are provided. Plant wells 79 are similar to plant wells 29 of circular coupler 20.

Figure 7:
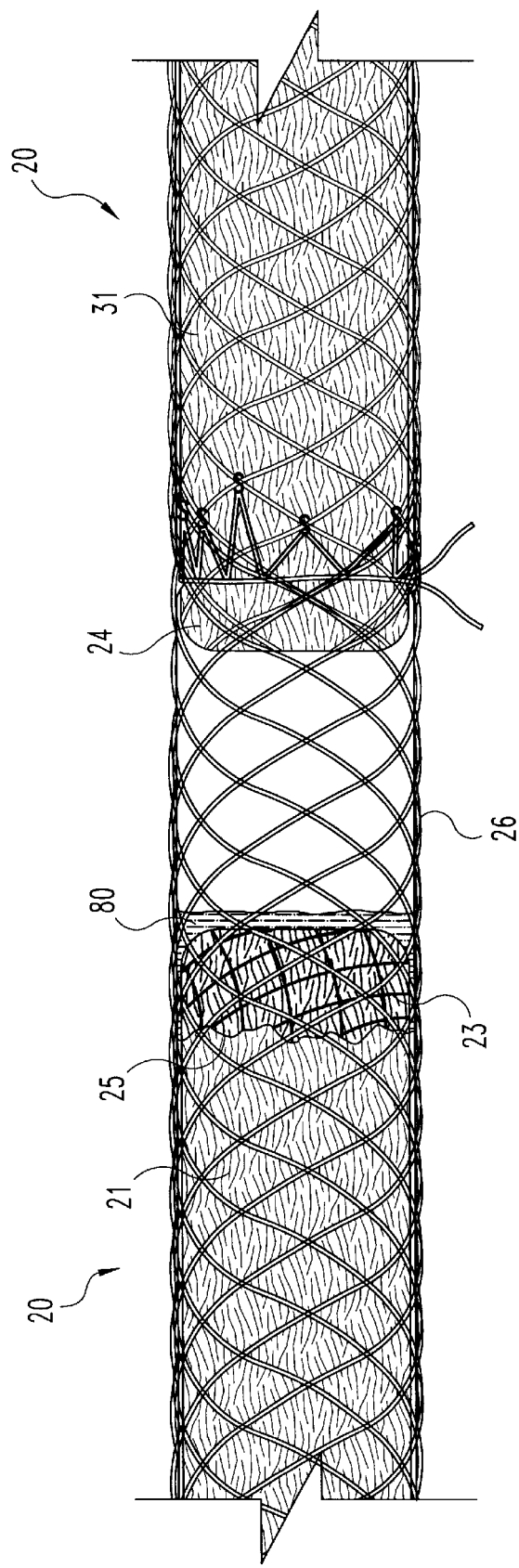
FIG. 7 is a perspective view showing the joining of two adjacent circular coupler fiber logs.

The coupler fiber logs are preferably stored and transported as individual units, uncoupled. After delivery to the installation site, the individual coupler fiber logs are joined or connected end-to-end to produce an linear erosion and sediment control barrier. FIG. 7 depicts the method of joining two circular coupler fiber logs 20. While circular couplers 20 are used in the illustration, it is understood that rectangular couplers 60 and triangular couplers 70 are similarly coupled to form linear erosion and sediment control barriers. As shown in FIG. 7, the two circular coupler 20 to be joined are brought together in an end to end orientation having second end 25 of the first circular coupler 20 (at the left hand side) facing first end 24 of the second circular coupler 20 (at the right hand side). The net extension 26 of the first circular couple 20 is unfolded from its storage position and is extending out. A quantity of loose fiber 80 is first packed around plug 23 to fill the gaps between the shoulder of plug 23 and net extension 26. First end 24 of the second circular coupler 20 is then received inside net extension 26 of the first circular coupler. Cinch cord 27 of the first circular coupler 20 is hooked onto the plurality of S-hooks placed around first end 24 of the second circular coupler 20. The second circular coupler 20 is then pulled towards the first circular coupler 20, by pulling on cinch cord 27 until the second circular coupler 20 engages loose fibers 80 and plug 23. Thusly situated, net extension 26 of the first circular coupler 20 overlaps casing 22 of the second circular coupler 20. Cinch cord 27 is pulled taut and the ends of cinch cord 27 secured. The two adjacent circular couplers 20 are thus joined together, preferably with end 24 butted against loose fiber 80 and/or end 25. After securing the first two circular couplers 20 together, the procedure may be repeated to add a third and a fourth, etc. circular couplers 20 until a erosion and sediment control barrier of a desirable length is formed.

While the above method of securing the coupler fiber logs together are particularly illustrated, those of ordinary skill in this art should appreciate that one may use many conventional methods to join together the net extension of one coupler fiber log to the body of the second coupler fiber log. For example, one could use lacing, staples, wire, plastic ties, like those that are commonly used to hold electrical wires together, adhesive, adhesive tape, non-adhesive tape, stove clamps like those to connect a household clothes dryer to ductwork, a belt tied around the over-lapping casings, cable laced through or tied around the over-lapping casings, or any other method commonly known to be used to join or mend netting or join tubular structures end-to-end.

Figure 8:
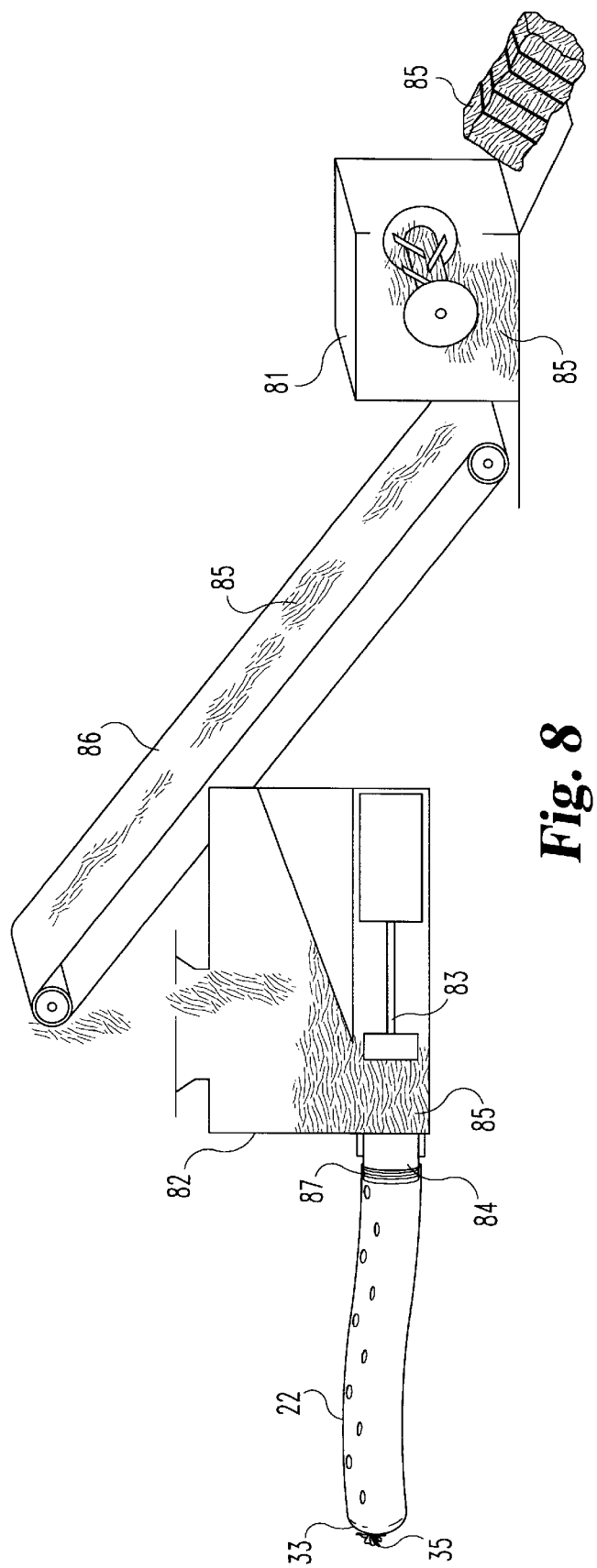
FIG. 8 is a schematic view of the machinery suitable for the manufacturing of coupler fiber logs.

Coupler fiber logs of different dimensions and shapes may be manufactured by conventional machinery that generally includes a tiller 81, a hopper 82, a pusher 83, and a stent tube 84. The differently shaped coupler fiber logs are constructed through the use of the appropriate shaped pushers 83 and stent tubes 84. Referring now to FIG. 8 which shows a schematic drawing for the manufacturing of a circular coupler 20. Circular coupler 20 is formed by packing a quantity of loose coir fibers 85 into a casing 20. Coir fibers 85 can be purchased commercially in bales of approximately 360 pounds each. Generally, the baled fibers have not been pre-processed and much of their natural layering remains. So being, the inventors have found that a more consistent circular coupler 20 can be produced by first fluffing the coir fibers 85. Thus, after un-baling, the coir fibers 85 are placed in tiller 81 where the fibers are disrupted and separated. The fluffed-up coir fibers 85 are then delivered to hopper 82 via a conveyer belt 86. A cylindrical pusher 83, slides back and forth horizontally immediately below hopper 82 and pushes loose coir fibers 85 through a cylindrical stent tube 84 and into an awaiting casing 22. Casing 22 is wrapped around and frictionally held to the outside of stent tube 84 by a chain belt 87. Initially, casing 22 is positioned such that closed end 33 of casing 22 abuts the exit of stent tube 84. As the coir fibers 85 are fed into casing 22, closed end 33 slides outward and causes the release of unfilled sections of casing 22 underneath chain belt 87.

The rate of release of casing 22 determines the packing density of circular coupler fiber log 20; the slower casing 22 is released, the higher the packing density of the resultant coupler fiber log 20. The frictional force applied by belt 87 onto casing 22 as casing 22 resides over stent tube 84 controls the rate of release of casing 22. The amount of applied frictional force to effect a release rate is empirically determined. After a prescribed length of circular coupler fiber log 20 is reached, filler pack 21 formed by loose coir fibers 85 is capped with plug 23. Casing 22 is then released from stent tube 83, and net extension 26 is peeled over and fold around the newly formed circular coupler fiber log 20.

The coupler fiber logs of the present invention have multiple applications as erosion and sediment control barriers, e.g., for buffing of flow and wave forces, sediment capture, re-vegetation and erosion control. The coupler fiber logs can be deployed singly or in combination with other coupler fiber logs, and be arranged in various configurations to suit the application and to accommodate the installation site environment.

Figure 9:
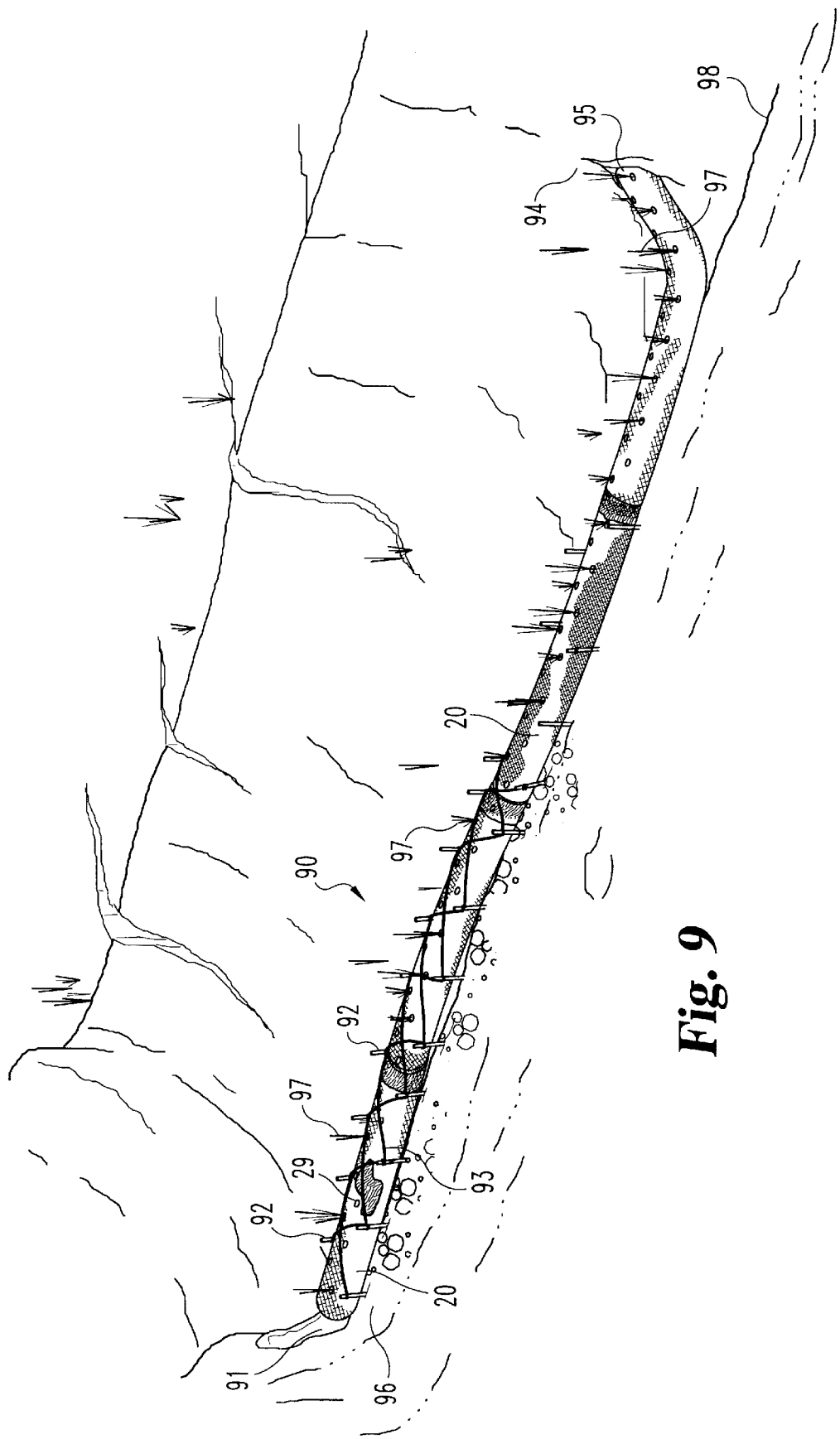
FIG. 9 is a perspective view of an embodiment of an erosion and sediment control barrier of the present invention installed at a water's edge.

FIG. 9 show an erosion and sediment control barrier 90 formed by circular couplers 20 installed at a shoreline. While circular couplers 20 are used for this illustration, it is understood that other shaped coupler fiber logs may also be used. Erosion and sediment control barrier or barrier 90 dissipates and reduces the effect of the erosive forces produced by wave action and flowing water. Barrier 90 may be placed below, at or above the water's edge. Commonly, the erosion and sediment control barrier 90 is placed where the water extends up to about two-thirds the height of barrier 90.

As illustrated, barrier 90 includes a plurality of circular couplers 20 coupled together and set into a shallow trench 91 and held by stakes 92 and ropes 93 that are wound between stakes 92 and over circular couplers 20. Erosion control barrier 90 is generally assembled in situ by methods previously described. The dimension of trench 91 necessary for the placement of barrier 90 depends on the site geometry. In one embodiment for setting a barrier 90 composed of a 16-inch diameter circular couplers 20, trench 91 is 4 inches deep and 10.5 inches wide. Anchor stakes 92 are typically placed in the front and in the back of barrier 90 at user-prescribed distances, usually about 1 to 2 feet apart on each side of barrier 90. Stakes 92 preferably are made of hard wood, have about a 2 inches by 2 inches cross-section, are approximately 36 inches long, and are preferably notched at their upper end to receive rope 93. With stakes 92 implanted in the sediment/soil 94, ropes 93 are lashed to stakes 92 in a front-and-back rotation, similar to the process of lacing your shoes. For further security, the ends 95 of barrier 90 may be buried into the existing bank. Thusly secured, the land ward side behind barrier 90 is preferably back filled to ground level. In addition, rock rip rap 96 or rock retainer basket may be placed on the water side in front of barrier 90 for added security.

While it is convenient and expedient to use stakes 92 and ropes 93 to secure barrier 90 to ground 94, other securing methods may also be used. Barrier 90 may also be secured with rock, geotextiles, geogrid, earth anchors, and the likes according to the site conditions. While methods for placing and anchoring barrier 90 have been suggested, it is understood that the placement and anchoring of an erosion and sediment control barrier is site dependent and is well known to a person of ordinary skill in the art. For the convenience of the reader, however, additional details of the use and installation of coupler fiber logs can be found in U.S. Pat. Nos. 5,338,131; 5,425,597; 5,641,244; and 5,678,954 to Bestman, as well as, U.S. Pat. No. 5,951,202 to Brown, the disclosures of which are all specifically incorporated into this specification by reference.

In addition to relying on the physical mass of barrier 90 to control erosion, the illustrated embodiment contemplates using vegetation or plants 97 to stabilize the surface layer of sediment/soil 94. The circular couplers 20 forming barrier 90 are provided with plant wells 29. It is contemplated that the roots of plants 97 which grow down through plant wells 29 to the underlying soil and hold the underlying soil in place.

Figure 10:
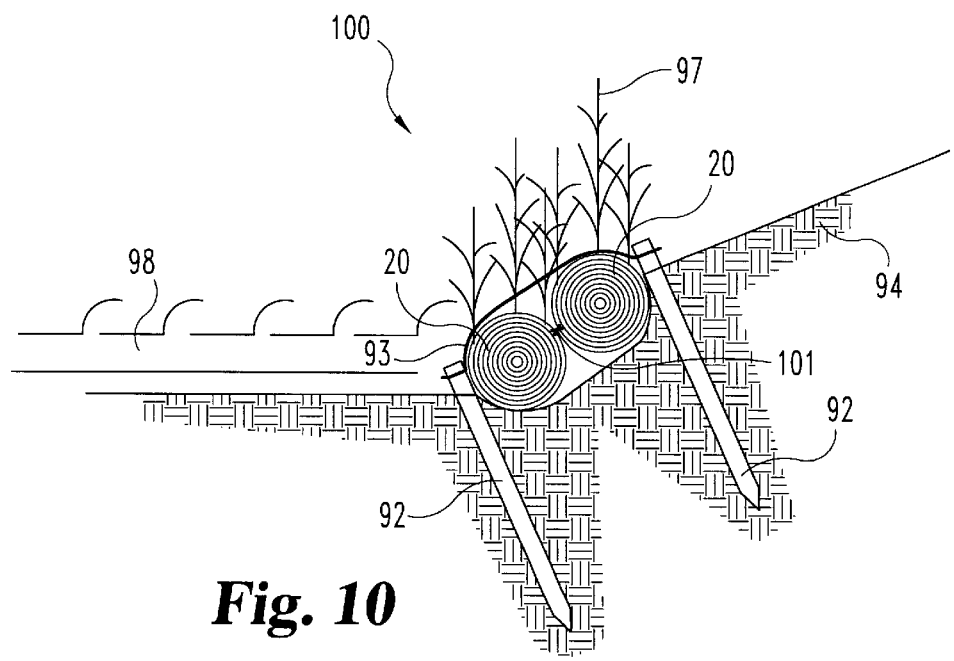
FIG. 10 is a side sectional view of a two-tiered erosion and sediment control barrier of the present invention installed at a water's edge.

While only one linear erosion barrier 90 is shown installed in FIG. 9, it is understood that multiple linear erosion control barriers 90 may be installed in parallel or in other configurations where situation demands. FIG. 10 shows a two-tiered barrier 100 having two rows of joined circular coupler 20 installed along the water edge 98. The two rows of joined circular couplers 20 are placed parallel to each other and secured by lacing 101. The two-tiered barrier 100 is anchored to the soil/sediment 94 with stakes 92 and rope 93 as described for barrier 90 above. The circular coupler 20 composing two-tiered barrier 100 are provided with plant wells to promote the growing of plants 97 through circular couplers 20.

Figure 11:
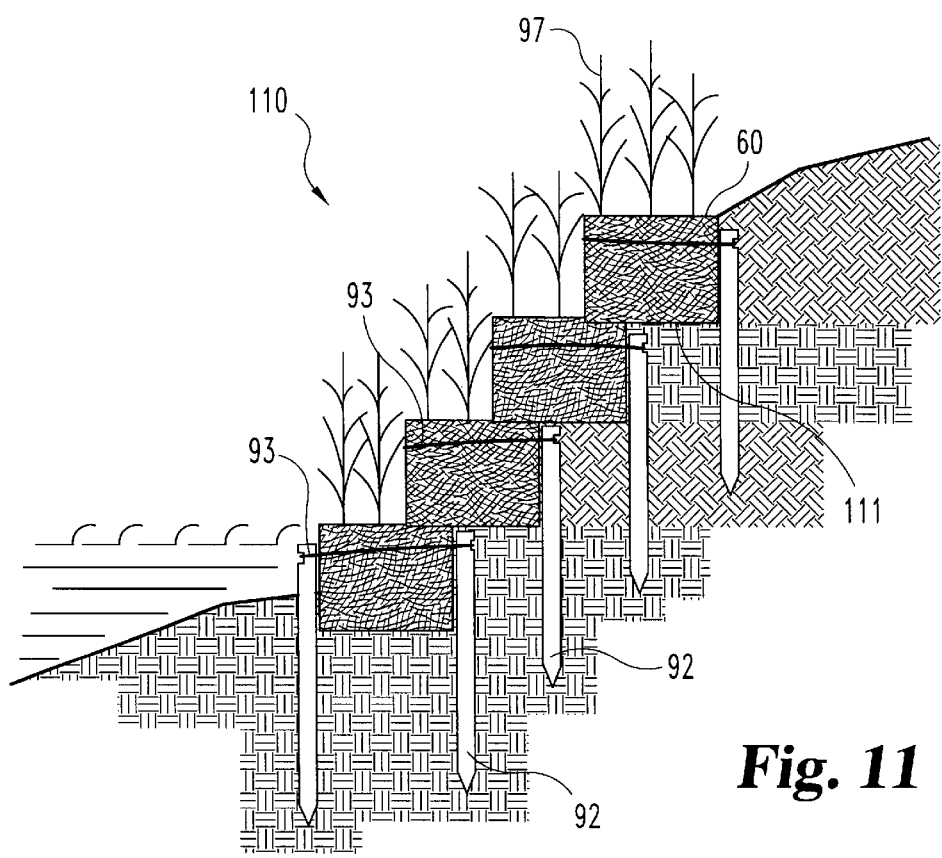
FIG. 11 is a side sectional view of a terraced erosion and sediment control barrier of the present invention, installed at a water's edge.

FIG. 11 shows a erosion and sediment control terrace 110 which provides protection to shorelines. Terrace 110 includes multiple rows of rectangular couplers 60 stacked on each other and on a precut sub-grade soil terrace 111. Rectangular couplers are held by stakes 92 anchored into the soil terrace 111 and are further held by ropes 93 which wind around rectangular couplers 90 and tie to stakes 92. In addition to relying on the physical mass of rectangular coupler 60 to control erosion, the illustrated embodiment further contemplates the use of vegetation or plants 97 to stabilize the underlying soil.

Figure 12:
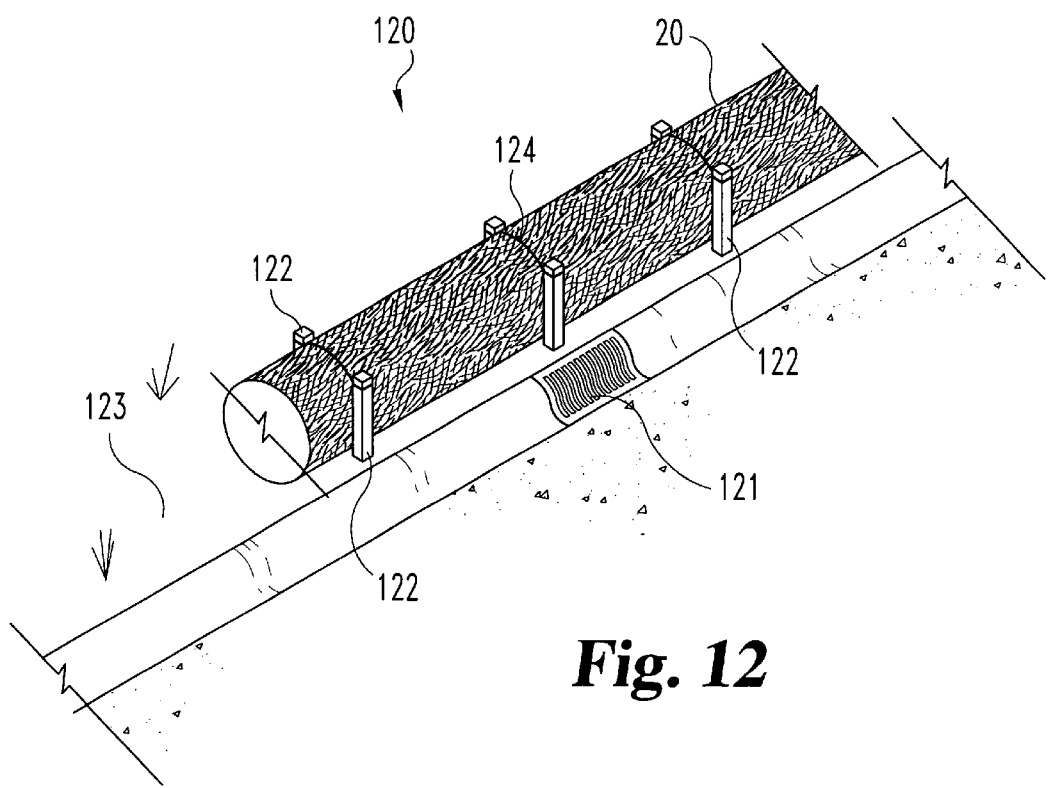
FIG. 12 is a perspective view of a linear silt trapper, an embodiment of the erosion and sediment control barriers of the present invention, installed in front of a curb inlet.

The coupler fiber logs may also be used to entrap and capture sediment and is useful in many locations and situations where a sediment barrier needs to be constructed quickly. FIG. 12 shows a linear silt-trapper 120 placed in front of a curb side inlet 121. Silt-trapper 120 allows water to seep through and drain to inlet 121 but traps the silt and sediment behind. In this embodiment, silt-trapper 120 is constructed of circular couplers 20 joined together to form a linear barrier of sufficient length. It is understood other geometric shaped coupler fiber logs may also be used. Silt-trapper 120 is held between pairs of stakes 122 anchored into the sediment/soil or ground 123 and further held by ropes 124 which are wound between each pair of stakes over circular couplers 20. Silt trapper 120 is formed by circular couplers 20 which are 12 inches in diameter. However, it is understood that the type of circular coupler fiber logs 20 required is determined by the application site environment. Anchor stakes 122 are typically placed in the front and in the back of silt-trapper 120 at user-prescribed distances, usually about 1 to 2 feet apart on each side of silt-trapper 120. Stakes 122 preferably are made of hard wood, have about a 1.5 inches by 1.5 inches cross-section, are approximately 36 inches long, and are preferably notched at their upper ends to receive ropes 124. Preferably, ropes 124 are made of nylon and are approximately 0.25 inch in diameter.

Figure 13:
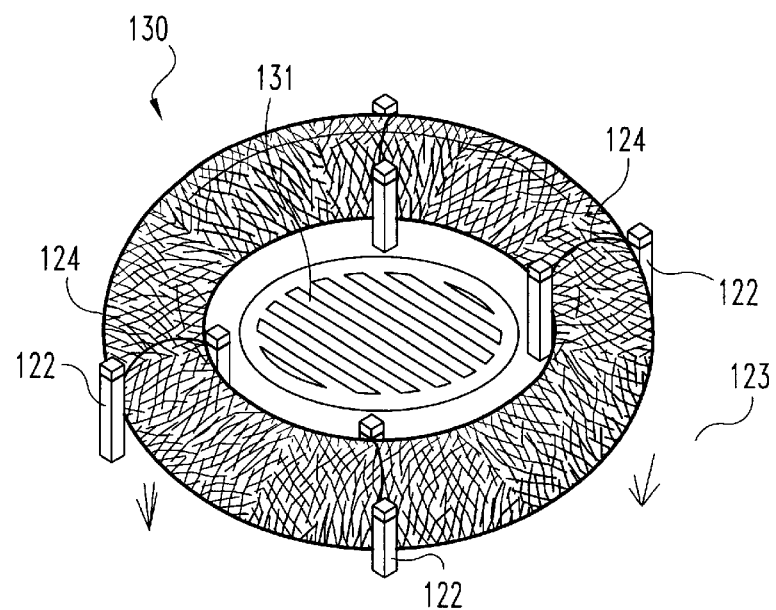
FIG. 13 is a perspective view of a ring silt trapper, an embodiment of the erosion and sediment control barriers of the present invention, installed around a storm inlet.

Sediment barriers may be constructed to various geometric configuration in addition to the linear silt-trapper 120 described above. FIG. 13 shows a ring silt-trapper 130 for the protection of a storm inlet 131. Ring silt-trapper 130 is constructed with circular couplers 20 coupled together to form a ring of the prescribed diameter. Similar to linear silt-trapper 120, ring silt-trapper 130 are held between pairs of wooden stakes 122 anchored to ground 123 and secured with ropes 124 wound over ring silt-trapper 130.

Figure 14:
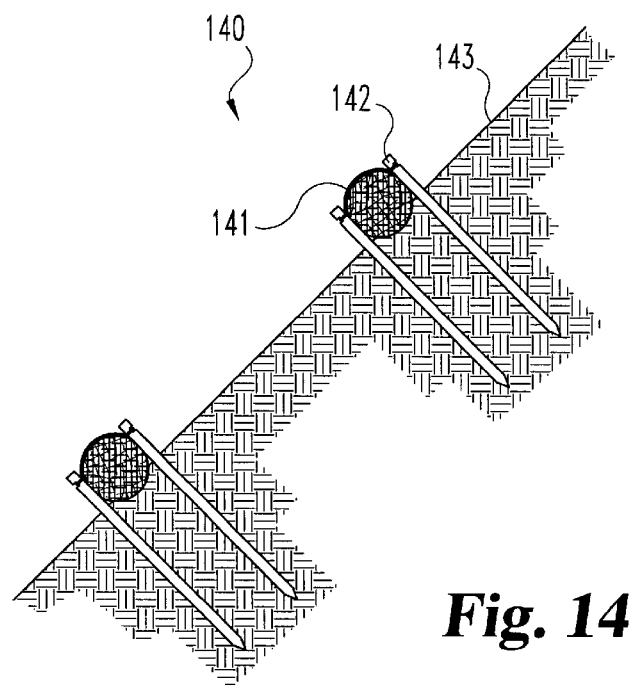
FIG. 14 is a side sectional view of a prairelog, an embodiment of the slope stabilizer of the present invention, installed on a steep slope.

The coupler fiber logs of the present invention may also be used on dry slope for slope stabilization. FIG. 14 shows a series of prairelog 140 installed on a 45° slope 143. Prairelog 140 hinders the continuous slide of soil and sediments down such steep slopes, and hence reduces slope erosion. Prairelog 140 are typically placed across gradient of slope 143 in rows at user prescribed distances, usually about 3 feet apart.

Prairelog 140 is constructed of circular couplers 20, either singly or joined, to form a linear barrier of sufficient length. While the use of circular couplers 20 is illustrated, it is understood other shaped coupler fiber logs, particularly triangular couplers 70, may also be used. Prairelog 140 is held between pairs of stakes 142 anchored into slope 143 and further held by ropes 144 which are wound between each pair of stakes over prairelog 140. Stakes 142 preferably are made of hard wood, have about 1 inch cross section, are approximately 24 inches long and are preferably notched at their upper ends to receive ropes 144. Ropes 144 are preferably made of a strong, durable material, e.g. nylon, polypropylene. However, any other material may be used.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A coupler fiber log comprising:
    a filler pack having a first end and a second end;
    a casing having a closed end and an open end, said casing extending about the outside of said filler pack, said closed end of said casing covering said first end of said filler pack;
    a plug located inside said casing between the second end of said filler pack and the open end of said casing, said plug at least partially covering the second end of said filler pack; and
    said casing having an extended section, said extended section axially extending between said plug and the open end of said casing.

2. The coupler fiber log of claim 1, wherein said filler pack is cylindrical having an approximately circular cross section.

3. The coupler fiber log of claim 1, wherein said filler pack forms an elongated log having an approximately rectangular cross section.

4. The coupler fiber log of claim 1, wherein said filler pack form an elongated log having a triangular cross section.

5. The coupler fiber log of claim 1, wherein said casing is porous.

6. The coupler fiber log of claim 1, wherein said casing includes perforations.

7. The coupler fiber log of claim 1, wherein said casing is a mesh netting.

8. The coupler fiber log of claim 7, wherein said mesh netting is constructed from a group of materials consisting of polypropylene, polyethylene, jute, hemp, coir, sisal and mixtures thereof.

9. The coupler fiber log of claim 1, wherein said plug is a ball of fibers surrounded by a net.

10. The coupler fiber log of claim 1, wherein said plug includes a stem and a disk, wherein said stem extends into the second end of said filler pack.

11. The coupler fiber log of claim 1, wherein said plug is a disk with an inside and outside face, said inside face is oriented toward said second end of said filler pack and said outside face is oriented toward said open end of said casing.

12. The coupler fiber log of claim 11, wherein said plug is at least partially made of latex bonded fibers.

13. The coupler fiber log of claim 1, wherein said filler pack is formed of coir fibers.

14. The coupler fiber log of claim 1, wherein said coupler fiber log has a length and includes a plurality of plant wells spaced along said length of said coupler fiber log.

15. The coupler fiber log of claim 1, wherein said casing includes a cinch cord woven around said open end of said casing and further comprises a plurality of s-hooks.

16. A modular erosion and sediment control barrier comprising:
    first and second coupler fiber logs, said coupler fiber logs including a fiber pack having a first end and a second end, a casing having a closed end and an open end, said casing extending about the outside of said fiber pack, said closed end of said casing covering said first end of said fiber pack, a plug located inside said casing between the second end of said fiber pack and the open end of said tubular casing, said plug at least partially covering the second end of said fiber pack; and said casing having a net extension, said net extension axially extending between said plug and the open end of said casing; and
    means for joining said first coupler fiber log to the end of said second coupler fiber log.

17. The modular erosion and sediment control barrier of claim 16, wherein said means for joining includes means for securing said net extension of said first coupler fiber log to the closed end of said second coupler fiber log.

18. The modular erosion and sediment control barrier of claim 17, wherein said means for securing includes a cinch cord woven around said open end of said casing and a plurality of s-hooks.

19. The modular erosion and sediment control barrier of claim 16, wherein said fiber pack further includes a shaped cross section, wherein said shape is selected from the group consisting of a circle, a three-sided polygon, and a four-sided polygon.

20. The modular erosion and sediment control barrier of claim 16, wherein said casing is a mesh netting.

21. The modular erosion and sediment control barrier of claim 20, wherein said mesh netting is constructed from a group of materials consisting of polypropylene, polyethylene, jute, hemp, coir, sisal and mixtures thereof.

22. The modular erosion and sediment control barrier of claim 20, wherein said plug is a ball of fibers surrounded by a net.

23. The modular erosion and sediment control barrier of claim 20, wherein said plug is a disk with an inside and outside face, said inside face is oriented toward said second end of said fiber pack and said outside face is oriented toward said open end of said casing and wherein said plug is at least partially made of fiber infiltrated latex.

24. The modular erosion and sediment control barrier of claim 16, wherein said coupler fiber log has a length and said coupler fiber log includes a plurality of plant wells spaced along the length of said fiber log.

* * * * *